March 17, 1964  G. R. BUSSEY  3,125,750
MULTICHANNEL DATA ACQUISITION AND TRANSMISSION SYSTEM
Filed April 30, 1962  4 Sheets-Sheet 1

INVENTOR.
GENE R. BUSSEY
BY
Mason, Kolehmainen, Rathburn and Wyss
ATTORNEYS

March 17, 1964 G. R. BUSSEY 3,125,750
MULTICHANNEL DATA ACQUISITION AND TRANSMISSION SYSTEM
Filed April 30, 1962 4 Sheets-Sheet 4

INVENTOR.
GENE R. BUSSEY
BY
Mason, Kolehmainen, Rathburn and Wyss.
ATTORNEYS ment of the period since the phase of the output pulse being measured is still completely determined by the energizing pulse, as described in said application Serial No. 208,154.

In accordance with an alternate preferred embodiment of the invention which is particularly applicable to transducers producing a very small frequency deviation over the full scale range, a feedback circuit may be used, repetitively energizing or pulsing the transducer on every half-cycle of free oscillation so that the oscillatory transient is re-initiated every half-cycle and does not die out as in the case of the damped oscillatory transient. Such an arrangement provides a substantially greater multiplication of the zero to full scale deviation for still greater accuracy in readout. In this latter arrangement, a reset pulse is derived from the oscillatory transient itself at the end of the first half-cycle of this ringing transient and this reset pulse is used to energize the resonant circuit again so that the oscillatory transient is re-initiated. A preset counter is used to control the number of reset pulses applied to the transducer and the output pulse width is determined by the time interval between the last reset pulse and the nearest clock pulse preceding this last reset pulse.

The invention, both as to its organization and method of operation, together with further objects and advantages thereof, will best be understood by reference to the following specification taken in connection with the accompanying drawings, in which.

Figure 1:
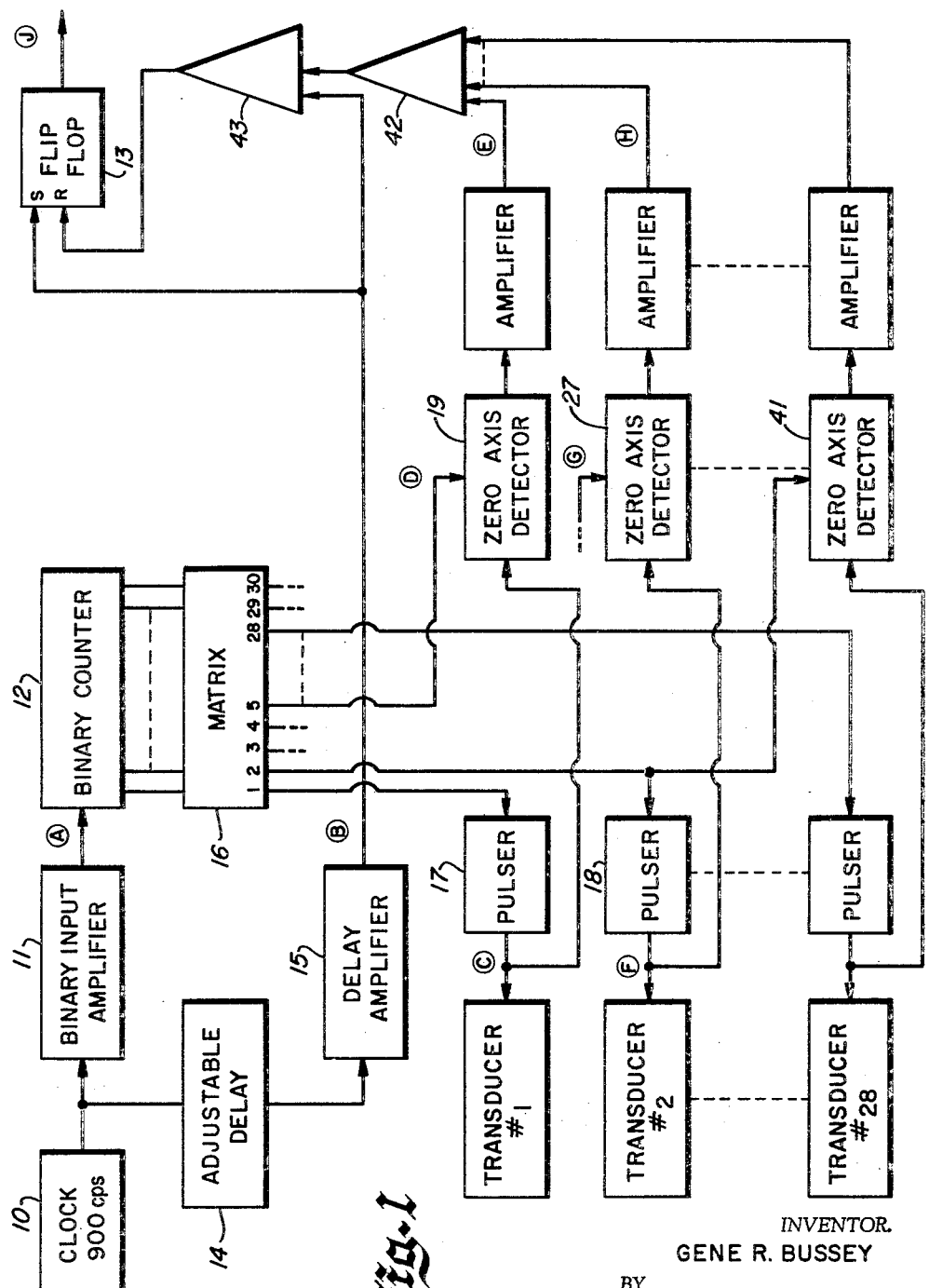
FIG. 1 is a block diagram of a preferred embodiment of my invention in which each transducer output is measured a given number of commutation intervals after interrogation or pulsing thereof.
Figure 2:
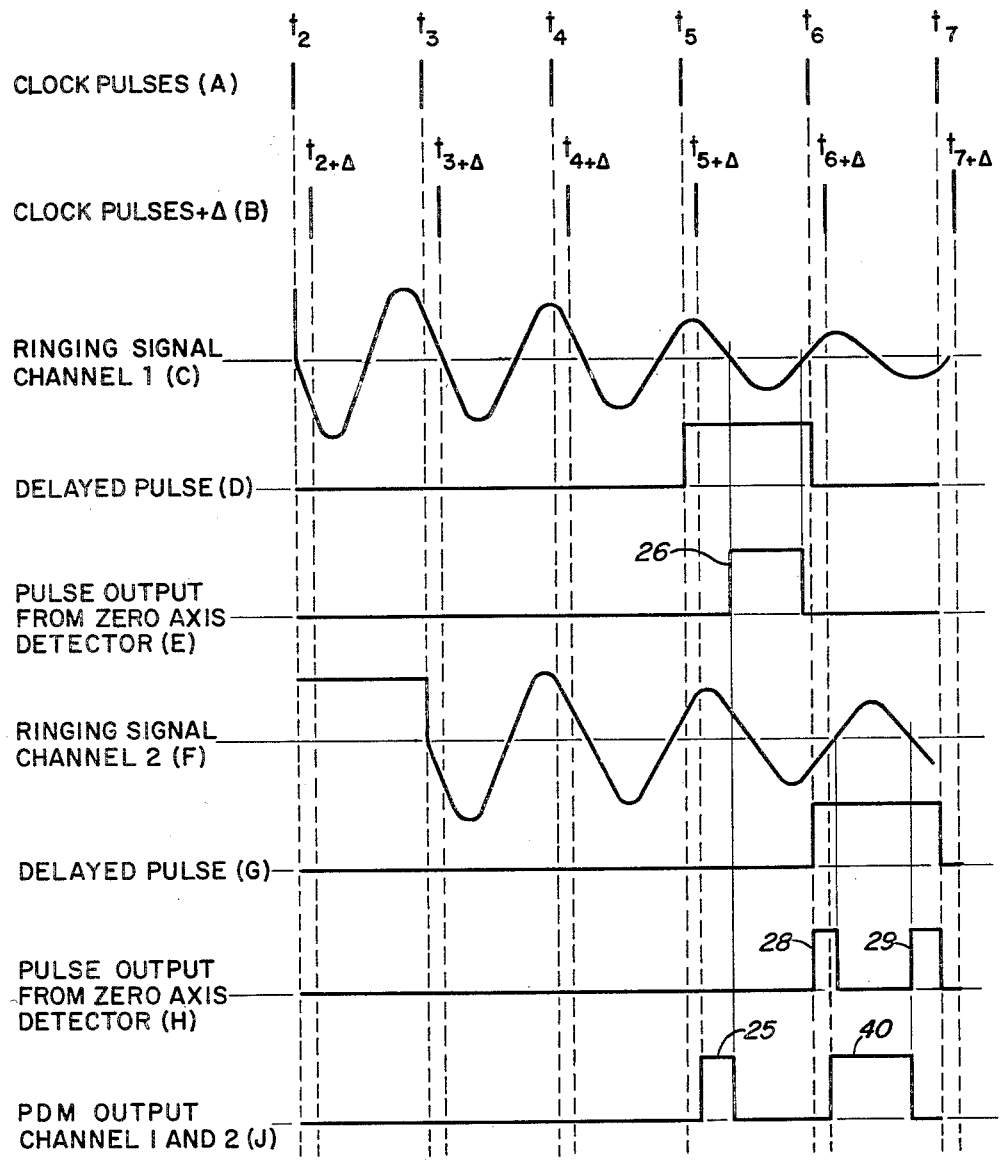
FIG. 2 shows voltage waveforms observable at various places in the system of FIG. 1.

Referring now to FIG. 1, a source of clock pulses 10 generates regularly spaced pulses which are amplified by binary input amplifier 11 and conducted to binary counter 12 in the form shown in FIG. 2(a). These clock pulses also are transmitted to a flip-flop 13 by means of an adjustable delay circuit 14 and delay amplifier 15. The delayed pulses entering the flip-flop 13 are in the form shown in FIG. 2(b). A ring counter 12 is provided having a suitable number of stages sequentially to interrogate each transducer. The widths of the output pulses of the counter 12 are thus determined by successive clock pulses, as shown for example in FIG. 2(d) and these pulses are transmitted through a matrix 16 which has as many output lines as there are transducers. In the illustrated embodiment twenty-eight transducers are sequentially interrogated and measured, transducers not being provided for commutation cycles 29 and 30 in order to provide a signal gap of two intervals to facilitate frame detection in accordance with conventional telemetry practice. Each of these transducers comprises a passive resonant circuit which is pulsed or shock excited by an energizing pulse so as to produce a damped oscillatory transient across the resonant circuit as soon as the energizing pulse is removed, as described in more detail in the above identified application Serial No. 208,154. Transducer number 1, for instance, receives only the first counter pulse in any sequence, this pulse being transmitted from the matrix over the line to pulser 17 which amplifies and reshapes the pulse for the transducer. When pulsed, transducer number 1 initiates a damped oscillatory transient or ringing signal at its resonant frequency, as shown in FIG. 2(c), coincident with the trailing edge of the counter pulse.

In response to the next clock pulse, binary counter 12 sends an output pulse through matrix 16 on its second output line to pulser 18 which feeds transducer number 2. This transducer then goes into oscillation as shown by FIG. 2(f). Successive transducers (not shown) are thus pulsed and are successively shock excited into damped oscillation.

The fifth clock pulse of the sequence causes binary counter 12 to pulse transducer number 5 (not shown) by means of matrix 16, and the output pulse from the matrix (FIG. 2(d)) also is fed to a zero axis detector 19 to which is also supplied the ringing signal produced by transducer number 1. The effect of this delayed counter pulse on the zero axis detector 19 is to make it receptive only to a predetermined portion of the oscillatory signal from transducer number 1 in the vicinity of the third and fourth cycles of this signal, as will be evident from a comparison of FIGS. 2(c) and 2(d). The purpose of the zero axis detector is to detect the point of points within the delay pulse interval at which the oscillatory ringing signal crosses a predetermined voltage level. In the illustrated embodiment this reference level is preferably close to the A.C. zero axis of the waveform and the detector 19 develops a positive output pulse shown in FIG. 2(e) which occurs during the delay pulse interval (FIG. 2(d)) and corresponds to the first half-cycle of the fourth cycle of the ringing signal which is negative with respect to the zero axis. The detector 19 may comprise any suitable form of trigger circuit or the like, which is enabled by the delay pulse FIG. 2(d) and detects the crossover points of the corresponding portion of the ringing signal, i.e., the edges of the amplified and shaped pulse shown in FIG. 2(e).

Figure 3:
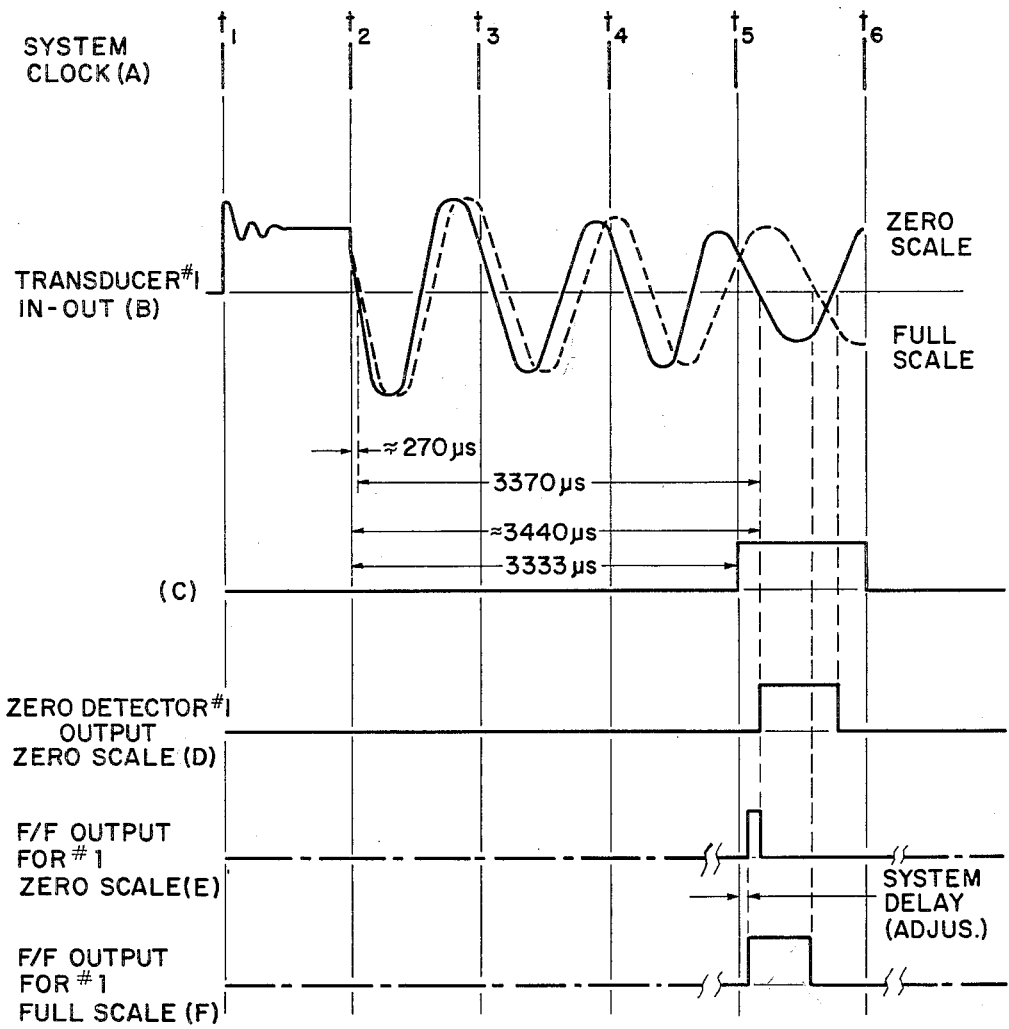
FIG. 3 is a collection of waveforms produced in the system of FIG. 1 showing the effect of zero and full scale readings of the variable measured by the transducer.

As before mentioned, the delayed clock pulses shown in FIG. 2(b) are applied to flip-flop 13 at terminal s. Accordingly, the fifth delayed clock pulse changes the state of the flip-flop 13, initiating the leading edge of the voltage output pulse 25 shown in FIG. 2(j). The arrival of the leading edge 26 of the pulse output FIG. 2(e) from zero axis detector 19 at terminal r of flip-flop 13 returns the flip-flop back to its original state, thus ending the first output pulse 25 of FIG. 2(j), this output pulse having a width which is a measure of the elapsed time between the delayed fifth clock pulse and the next following zero crossover in the negative direction of the ringing signal of transducer number 1 and hence is a measure of the variable quantity to which transducer number one responds. As the quantity being measured varies, the resonant frequency of the transducer resonant circuit is varied correspondingly and hence the zero crossover point detected by the detector 19 is changed to produce a change in the width of the output pulse 25. Also, since the measurement of the resonant period or frequency of the ringing signal does not start until the fourth cycle a substantial multiplication of the transducer deviation from zero to full scale is achieved. More particularly, as shown in FIG. 3, wherein the clock pulses are shown in FIG. 3(a), the two ringing signals produced by transducer number one are shown in FIG. 3(b) wherein the zero scale ringing signal or damped oscillatory transient is shown in full lines and the full scale ringing signal is shown in dotted lines. FIG. 3(c) shows the delayed binary counter output pulse (similar to FIG. 2(d)) which enables the zero detector 19 so that waveform FIG. 3(d) is produced. The corresponding flip-flop output, shown in FIG. 3(e), is initiated by delayed clock pulse T5 (not shown) and is terminated by the leading edge of waveform 3(d). The flip-flop output corresponding to full scale of the measured variable is shown in FIG. 3(f) and is initiated as was waveform FIG. 3(e), and is terminated by the next zero crossover of the dotted line waveform of FIG. 3(b).

The same action described above for transducer number 1 is thereafter followed for each transducer in sequence. Thus, the next transducer number 2 is energized during the second counter output pulse so as to produce the damped oscillatory transient shown in FIG. 2(f). The sixth counter pulse shown in FIG. 2(g) is used as the enabling pulse for the zero axis detector 27 whose output when amplified and shaped if necessary is shown in FIG. 2(h). It will be noted that waveform FIG. 2(h) consists of two pulses corresponding to the two intervals within the delay pulse of FIG. 2(g) during which the ringing signal of FIG. 2(f) is negative with respect to the zero axis. However, it is only the positive or leading edges 28 and 29 of the waveform of FIG. 2(h) which would cause the flip-flop 13 to be reset and the leading edge 28 occurs ahead of the delayed clock pulse and hence is eliminated. Accordingly, only one output pulse 40 is produced corresponding to transducer number two which has a width equal to the value of the quantity measured by this transducer.

In a similar manner transducer number 28 is energized or pulsed corresponding to the twenty-eighth counter pulse. However, the delayed counter pulse supplied to the zero axis detector 41 associated with transducer number 28 is taken from channel 2 of the counter matrix 16, as shown in FIG. 1 so that the proper delay of five channels will be provided in the same manner as described in detail heretofore in connection with transducers 1 and 2.

In this connection, it will be noted that the gates 42 and 43 and the flip-flop 13 are all common to all of the transducers so that circuit complexity is minimized. It will, of course, be understood that any suitable arrangement may be employed to measure the width of the output pulses 25, 40, etc., corresponding to each transducer. If desired, a high frequency clock source and frequency divider may be substituted for the clock 10 and the high frequency clock pulses themselves utilized to measure the width of the pulses 25, 40, etc. Such an arrangement has the advantage that quantizing or input phase errors are eliminated due to the fact that the clock pulses are synchronized in phase with the pulses applied to the transducer resonant circuits and hence are in predetermined phase relation to the ringing signals from which the output pulses 25, 40 etc., are derived.

Figure 4:
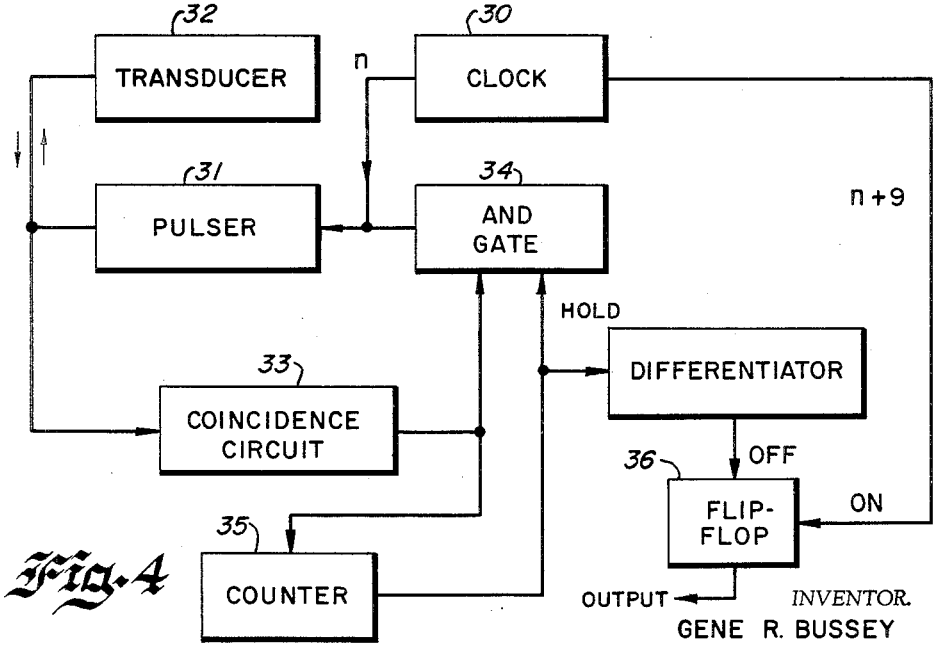
FIG. 4 is a block diagram of an alternate embodiment of my invention, incorporating feedback for repetitive pulsing of the transducer.

The waveforms of FIG. 3 are for a normal transducer having a substantial deviation between zero and full scale. However, many transducers exist having much smaller deviations for which the change in output pulse width would be very small. The embodiment shown in FIG. 4 is designed for this type of transducer, and makes possible a greater multiplication of the deviation than the system of FIG. 1 so that a useable pulse width deviation is obtained. In the system of FIG. 4 clock pulse n (FIG. 5(a)) from clock 30 is applied through a pulser 31 to transducer 32 so that the resonant circuit of this transducer starts to ring when the pulse is removed. The transducer output is applied to a coincidence circuit 33 which is adjusted to detect a negatively-going waveform, i.e., one going in a negative direction, and to pass this waveform when it starts going negatively. Thus, as shown in FIG. 5(b), the transducer output first goes negatively at the end of the clock pulse n and then rises sinusoidally to a maximum positive value. At this point it begins going negatively so that the coincidence circuit conducts and supplies an output signal to AND gate 34 and to a counter 35, the coincidence circuit output being as shown in FIG. 5(c). As soon as the first pulse is supplied to the counter 35 from the coincidence circuit 33, the counter 35 functions to generate a hold pulse shown in FIG. 5(d), which is also applied to the AND gate 34, holding it open. Since the AND gate is open the pulse from coincidence circuit 33 is passed to pulser 31 and the transducer is again pulsed into oscillation. This creates a series of equal amplitude pulses (shown in FIG. 5(b)) at the transducer output, preventing attenuation of the output such as would normally occur with a damped oscillatory transient or ringing signal. This repulsing action will continue as long as hold pulse FIG. 5(d) exists.

Figure 5:
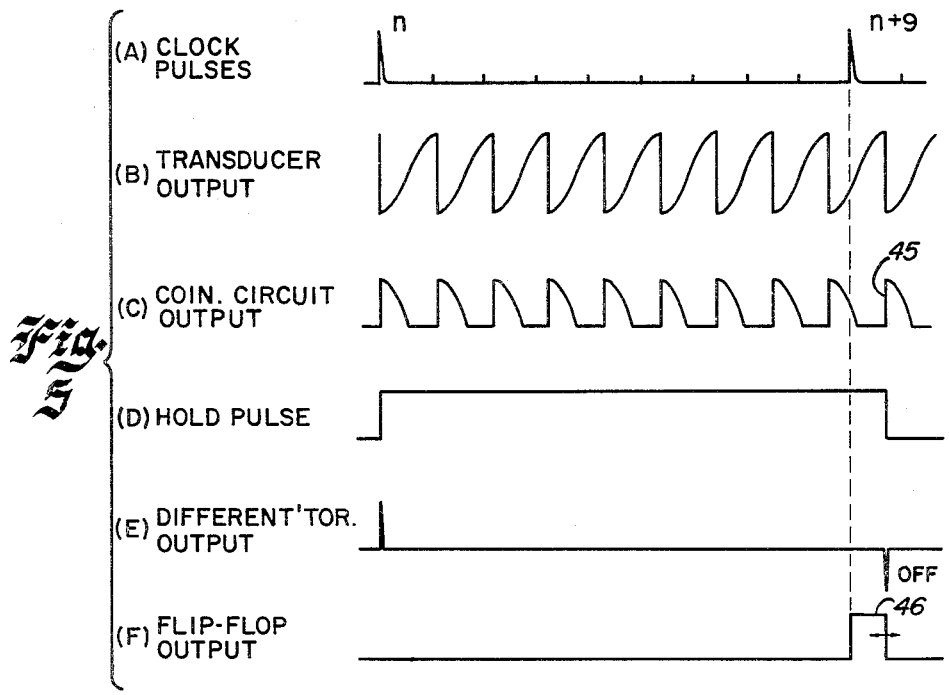
FIG. 5 shows a series of voltage waveforms observable in the system of FIG. 4.

The counter 35 is a preset counter and is designed to accept a certain number of coincidence output pulses before terminating the hold pulse. As shown in FIG. 5, the tenth output pulse 45 (FIG. 5(c)) from the circuit 33 causes the counter 35 to terminate the hold pulse, thereby closing AND gate 34. Thus, it is seen that the length of the hold pulse is determined by the transducer ringing frequency, since the controlling coincidence output pulses are spaced according to the half-cycle durations of the ringing signal.

The output of clock 30 is chosen in relation to the preset count of counter 35, in this case so that clock pulse $n$ plus 9 occurs just prior to termination of the hold pulse, and is used to turn "on" flip-flop 36, thus initiating the flip-flop output pulse 46 shown in FIG. 5(f) whose duration is an indication of the information applied to transducer 32. The hold pulse is differentiated as shown in FIG. 5(e) and its terminal change creates a negative "off" pulse which is applied to the flip-flop 36 to terminate the flip-flop output pulse 46.

The embodiment of FIG. 4 thus allowed multiplication of the transducer deviation beyond the nominal 3 or 4 cycles of the ringing which are possible by the embodiment shown in FIG. 1. Since in FIG. 1 the tranducer ringing signal attenuates with time there is a practical limit beyond which there is no useable signal. Theoretically, the circuit of FIG. 4 could be used to extend the deviation an infinite amount, but practically the extension is limited by the fact that error or non-linearity in the basic transducer is multiplied by the number of times the transducer is re-pulsed.

While the system of FIG. 4 is shown with only a single transducer, it will be understood that a plurality of transducers may be employed in a manner similar to that described in detail in connection with FIG. 1. Thus, the clock pulse $n+1$ would be used to excite the pulser associated with transducer number two and the $n+10$ clock pulse would be supplied to the flip-flop 36. The circuit components 31, 33, 34 and 35 would be provided in duplicate for transducer number two and the differentiated hold pulse output would be supplied to the flip-flop 36 through a suitable OR gate so that this flip-flop would be turned off by the termination of either the hold pulse corresponding to transducer number one or the hold pulse corresponding to transducer number two. Additional transducers can be sequentially energized through similar circuitry in the same manner, as will be readily apparent to those skilled in the art.

While the invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. In a time analog data transmission system having a plurality of resonant circuits whose resonant frequencies are controlled by applied stimuli and are equal and maximum when the applied stimuli have a known relationship to each other, means for generating a plurality of output pulses whose time durations are related to the resonant frequencies of the respective resonant circuits, minimum duration corresponding to the maximum resonant frequency, comprising: means for momentarily supplying a D.C. voltage successively to the resonant circuits at a frequency which is $n$ integral times the maximum resonant frequency; and means for gating from the resonant circuits oscillatory signals generated by a change in D.C. voltage, each gate for a particular circuit starting $n+1$ cycles after the circuit receives D.C. voltage, and ending at a selected point in the oscillatory signal.

2. The generating means of claim 1 wherein the gating means gates the oscillatory signals generated by the removal of D.C. voltage from the resonant circuits.

3. The generating means of claim 2 wherein the gate ends at the next positive-going zero crossover of the gated oscillatory signal.

4. The generating means of claim 3 wherein $n$ is the integer 2.

5. In a time analog data transmission system having a plurality of resonant circuits whose resonant frequencies are controlled by applied stimuli and are equal and maximum when the applied stimuli have a known relationship to each other, means for generating a plurality of output pulses whose time durations are related to the resonant frequencies of the respective resonant circuits, zero duration corresponding to the maximum resonant frequency, comprising: a source of D.C. voltage; first means for commutating the D.C. voltage successively to the resonant circuits at a frequency which is $n$ integral times the maximum resonant frequency; second means for commutating from the resonant circuits oscillatory signals generated by a change in D.C. voltage caused by the first commutating means, each commutation from a particular circuit occurring $n+1$ commutations after the commutation of D.C. voltage to that circuit; means responsive to the second commutating means for starting an output pulse at the start of commutation; and means responsive to a selected portion of the commutated oscillatory signal for ending the output pulse.

6. In a multichannel system for measuring a plurality of variable quantities, the combination of a passive resonant circuit for each of said quantities, means for varying the resonant period of each of said resonant circuits in accordance with variations of the corresponding quantity to be measured, means for applying energizing pulses to said resonant circuits in predetermined sequence, whereby damped oscillatory transients are produced across each of said resonant circuits, means for developing a delay pulse a predetermined time interval after each energizing pulse, and means controlled by said delay pulse for measuring the resonant period of a portion of the corresponding oscillatory transient which falls within the time interval of said delay pulse.

7. In a multichannel system for measuring a plurality of variable quantities, the combination of a passive resonant circuit for each of said quantities, means for varying the resonant period of each of said resonant circuits in accordance with variations of the corresponding quantity to be measured, means for applying energizing pulses to said resonant circuit in predetermined sequence, whereby damped oscillatory transients are produced across each of said resonant circuits, and means for measuring the resonant period of each of said oscillatory transients a predetermined time interval after initiation thereof, whereby said oscillatory transients may be produced in overlapping relation while permitting measurement of the resonant periods of all of said transients in sequence.

8. In a multichannel system for measuring a plurality of variable quantities, the combination of a passive resonant circuit for each of said quantities, means for varying the resonant period of each of said resonant circuits in accordance with variations of the corresponding quantity to be measured, means for applying energizing pulses to said resonant circuits in predetermined sequence, whereby damped oscillatory transients are produced across each of said resonant circuits, means for selecting a portion of each oscillatory transient which occurs a predetermined time interval after energization of the corresponding resonant circuit, and means for combining said selected portions of said oscillatory transients in a common output channel.

9. In a multichannel system for measuring a plurality of variable quantities, the combination of a passive resonant circuit for each of said quantities, means for varying the resonant period of each of said resonant circuits in accordance with variations of the corresponding quantity to be measured, means for applying energizing pulses to said resonant circuits in predetermined sequence, whereby damped oscillatory transients are produced across each of said resonant circuits, means for developing a control pulse which occurs a predetermined time interval after each energizing pulse, means controlled by each control pulse for determining the point at which the corresponding oscillatory transient passes through a predetermined voltage level, and means utilizing said determined points to provide output pulses having a width proportional to the resonant periods of the respective oscillatory transients.

10. In a multichannel system for measuring a plurality of variable quantities, the combination of a passive resonant circuit for each of said quantities, means for varying the resonant period of each of said resonant circuits in accordance with variations of the corresponding quantity to be measured, means for applying energizing pulses to said resonant circuits in predetermined sequence, whereby damped oscillatory transients are produced across each of said resonant circuits, means for developing a control pulse for each resonant circuit which occurs a predetermined time interval after each energizing pulse is applied thereto, means individual to each resonant circuit and controlled by said control pulse for producing a pulse representing the point within the interval of said control pulse at which the corresponding oscillatory transient passes through a predetermined voltage level, and means utilizing said point representing pulses and common to said resonant circuits for producing output pulses having a width proportional to the resonant period of the respective oscillatory transients.

11. In a system for measuring a variable quantity, the combination of a passive resonant circuit, means for varying the resonant period of said resonant circuit in accordance with variations in the quantity to be measured, means for applying an electrical pulse to said resonant circuit, whereby an oscillatory transient is produced in said resonant circuit following said pulse, means for detecting when said oscillatory transient reaches a predetermined voltage level and producing a reset pulse in response thereto, means for applying said reset pulses to said resonant circuit so as to reinitiate said oscillatory transient in response to each reset pulse, means for producing a control pulse a predetermined time interval after said energizing pulse, means for counting said reset pulses and producing an output pulse in response to a predetermined number of said reset pulses, and means controlled jointly by said control pulse and said output pulse for producing a pulse having a width proportional to the resonant period of said resonant circuit.

12. In a system for measuring a variable quantity, the combination of a passive resonant circuit, means for varying the resonant period of said resonant circuit in accordance with variations in the quantity to be measured, means for applying an energizing pulse to said resonant circuit so that an oscillatory transient is produced thereacross, means for producing a reset pulse when said oscillatory transient reaches a predetermined voltage level, means for re-initiating said oscillatory transient in response to each of said reset pulses, means for producing a delay pulse a predetermined time interval after said energizing pulse, and means responsive to said delay pulse and a selected one of said reset pulses for producing an output pulse having a width proportional to the resonant period of said resonant circuit.

No references cited.